(12) United States Patent
Ochiai et al.

(10) Patent No.: US 7,071,639 B2
(45) Date of Patent: Jul. 4, 2006

(54) ELECTRIC MOTOR CONTROL APPARATUS

(75) Inventors: Shinobu Ochiai, Wako (JP); Keisuke Urushihara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/257,308

(22) Filed: Oct. 25, 2005

(65) Prior Publication Data

US 2006/0091835 A1  May 4, 2006

(30) Foreign Application Priority Data

Nov. 4, 2004  (JP) .............................. 2004-320012

(51) Int. Cl.
*H02P 5/00* (2006.01)
(52) U.S. Cl. ...................... 318/139; 318/140; 318/801; 318/800; 322/137; 322/127
(58) Field of Classification Search ................ 318/139, 318/140, 800, 801; 320/137, 127
See application file for complete search history.

(56) References Cited

U.S. PATENT DOCUMENTS

| | | | | |
|---|---|---|---|---|
| 5,436,540 A | * | 7/1995 | Kumar | ........................ 318/375 |
| 5,929,591 A | * | 7/1999 | Katou et al. | ................. 318/723 |
| 6,011,372 A | * | 1/2000 | Popovich et al. | ........... 318/560 |
| 6,626,002 B1 | * | 9/2003 | Notohara et al. | .......... 62/228.4 |

FOREIGN PATENT DOCUMENTS

| | | |
|---|---|---|
| DE | 3613918 A1 | 10/1986 |
| EP | 1 111 766 A1 | 6/2001 |
| JP | 09149685 | 6/1997 |
| JP | 3244845 | 10/2001 |
| JP | 2001314095 | 11/2001 |

OTHER PUBLICATIONS

European Search Report dated Dec. 29, 2005.

* cited by examiner

*Primary Examiner*—Rita Leykin
(74) *Attorney, Agent, or Firm*—Westerman, Hattori, Daniels & Adrian, LLP.

(57) ABSTRACT

An electric motor control apparatus suppressing power loss caused by driving an electric motor acting as a motor with a generated output of an electric motor acting as a generator. The electric motor control apparatus comprises a PAM controlled motor selecting unit (53) for determining which of "control pattern 1" and "control pattern 2" should be executed by comparison in total power loss, where a voltage control unit on the power generation side (51) performs voltage transformation with a PWM control in a first inverter (30) and generates a drive voltage for a second electric motor (12) with a PAM control in a second inverter (31) in the control pattern 1 and a voltage control unit on the driving side (52) outputs a rectified voltage from a generated voltage of a first electric motor (6) without voltage transformation in the first inverter (30) and generates a drive voltage for the second electric motor (12) with a PWM control in the second inverter (31) in the control pattern 2.

9 Claims, 13 Drawing Sheets

(CONTROL PATTERN 1)

(CONTROL PATTERN 1)

(CONTROL PATTERN 2)

(CONTROL PATTERN 2)

(CONTROL PATTERN 1)

(CONTROL PATTERN 1)

(CONTROL PATTERN 2)

(CONTROL PATTERN 2)

ELECTRIC MOTOR CONTROL APPARATUS

BACKGROUND OF THE INVENTION

1. Field of the Invention

The present invention relates to an electric motor control apparatus having at least two electric motors acting as a generator and a motor and causing them to operate in cooperation with each other.

2. Related Background Art

There is an already known method of controlling an output of an electric motor, a so-called PWM control for varying the amount of electricity supplied to the electric motor by means of an ON-OFF control action of a switching element provided in an inverter (for example, refer to Japanese Patent No. 3244845).

Referring to FIG. 13, there is shown an example of a system for controlling an output of an electric motor by means of the PWM control, showing a configuration diagram of a hybrid vehicle having an engine 100, a first electric motor 101 and a second electric motor 102 as driving sources. In this type of hybrid vehicle, the first electric motor 101 and the second electric motor 102 act as a motor and a generator, whereby the engine 100 and the first electric motor 101 drive the front wheels and the second electric motor 102 drives the rear wheels.

Then, an electronic control unit (ECU) 107 performs the PWM control with the ON-OFF control action of a switching element forming a first inverter 105 to transform a drive voltage for the first electric motor 101 and a generated voltage of the first electric motor 101, and performs the PWM control with the ON-OFF control action of a switching element forming a second inverter 106 to transform a drive voltage for the second electric motor 102 and a generated voltage of the second electric motor 102.

In this regard, when the first electric motor 101 is operated as a generator to supply a generated output of the first electric motor 101 and an output power of a battery 103 to the second inverter 106 for the purpose of operating the second electric motor 102 as a motor, the ECU 107 has controlled an output voltage of the first inverter 105 by the PWM control so that the output voltage of the first inverter 105 equals an output voltage of the battery 103. Thereafter, the ECU 107 has controlled the output voltage of the second inverter 106 by the PWM control so that the second inverter 106 outputs a drive voltage corresponding to a target output of the second electric motor 102.

When the PWM control is performed for both of the first inverter 105 and the second inverter 106 in this manner, however, there has been a problem of increasing power loss accompanied by the ON-OFF control action of the switching element in each of the inverters.

SUMMARY OF THE INVENTION

Therefore, it is an object of the present invention to provide an electric motor control apparatus having at least two electric motors acting as a generator and a motor and suppressing power loss caused by driving the electric motor acting as a motor with a generated output of the electric motor acting as a generator, resolving the above problem.

The present invention has been provided to achieve the above object. Therefore, first and second aspects of the present invention relate to an improvement in an electric motor control apparatus comprising: at least two electric motors acting as a motor and a generator; a battery; an inverter for generating a drive voltage of the electric motor from an input DC voltage and outputting the drive voltage when the electric motor acts as the motor and for converting a generated voltage of the electric motor to a DC voltage and outputting the DC voltage when the electric motor acts as the generator, the inverter being connected between each of the electric motors and the battery; and a voltage transformation control unit for performing a PWM control with an ON-OFF control action of a switching element forming an inverter connected to the electric motor activated as the motor to transform the drive voltage for the electric motor activated as the motor from the inverter, and for performing a PWM control with an ON-OFF control action of a switching element forming an inverter connected to the electric motor activated as the generator to transform the generated voltage of the electric motor activated as the generator.

Moreover, according to the first aspect of the present invention, the electric motor control apparatus further comprises a DC—DC converter for transforming an I/O voltage between the battery and each of the inverters, the DC—DC converter being connected to the battery; and, under conditions where at least one of the electric motors acting as the motor is selected as a PAM controlled motor and the inverter connected to the PAM controlled motor is placed in a state to generate a drive voltage without voltage transformation using the voltage transformation control unit, a voltage control unit on the power generation side for transforming the output voltage of the inverter connected to the electric motor acting as the generator by the voltage transformation control unit and transforming the output voltage of the DC—DC converter in such a way as to input a DC voltage corresponding to a target output of the PAM controlled motor to the inverter connected to the PAM controlled motor.

According to the present invention, the voltage control unit on the power generation side transforms the output voltage of the inverter connected to the electric motor acting as the generator and the output voltage of the DC—DC converter according to the target output of the motor selected as the PAM controlled motor. Therefore, the inverter connected to the PAM controlled motor can generate a drive voltage corresponding to the target output by the PAM control without voltage transformation using the voltage transformation control unit. This prevents an occurrence of power loss accompanied by the ON-OFF control action of the switching element with the PWM control in the inverter connected to the PAM controlled motor, thereby enabling a reduction in the total amount of power loss in each of the inverters in comparison with the case where the PWM control is performed in all of the inverters.

Moreover, at least one of the electric motors acting as the generator is selected as a PAM controlled motor and the inverter connected to the PAM controlled motor is placed in a state to output a DC voltage without voltage transformation using the voltage transformation control unit. In this condition, the electric motor control apparatus further comprises a voltage control unit on the driving side for transforming the output voltage of the DC—DC converter to a level which allows a generation of a drive voltage corresponding to a target output of the electric motor acting as the motor with the inverter connected to the electric motor acting as the motor and for performing voltage transformation using the voltage transformation control unit in such a way as to generate the drive voltage corresponding to the target output with the inverter connected to the electric motor acting as the motor.

According to the present invention, the voltage control unit on the driving side transforms the output voltage of the DC—DC converter to a level which allows the generation of the drive voltage, corresponding to the target output of the electric motor acting as the motor, with the inverter connected to the electric motor acting as the motor. Moreover, the voltage control unit on the driving side performs voltage transformation using the voltage transformation control unit in such a way as to generate the drive voltage corresponding to the target output with the inverter connected to the electric motor acting as the motor. Therefore, there is no need to perform the voltage transformation with the PWM control with the inverter connected to the electric motor acting as the generator that is selected as the PAM controlled motor, whereby the voltage control unit on the driving side places the inverter connected to the PAM controlled motor in a state to output a DC voltage without voltage transformation using the voltage transformation control unit. This prevents an occurrence of power loss accompanied by an ON-OFF control action of the switching element with the PWM control in the inverter connected to the PAM controlled motor, thereby enabling a reduction in the total amount of power loss in each of the inverters in comparison with the case where the PWM control is performed in all of the inverters.

Moreover, preferably the electric motor control apparatus further comprises a PAM controlled motor selecting unit for determining an electric motor to be selected as a PAM controlled motor by comparison between a first total power loss including the total amount of power loss in each inverter when the voltage control unit on the power generation side performed the voltage transformation control with the electric motor acting as the motor being used as the PAM controlled motor, and a second total power loss including the total amount of power loss in each inverter when the voltage control unit on the driving side performed the voltage transformation control with the electric motor acting as the generator being used as the PAM controlled motor.

According to the present invention, the PAM controlled motor selecting unit determines the electric motor selected as the PAM controlled motor by comparison between the first total power loss including the total amount of power loss in each inverter with the electric motor acting as the motor being used as the PAM controlled motor and the second total power loss including the total amount of power loss in each inverter with the electric motor acting as the generator being used as the PAM controlled motor. This enables a determination of the electric motor selected as the PAM controlled motor in such a way as to minimize the total amount of power loss in each inverter.

Moreover, the first total power loss and the second total power loss each include power loss in the DC—DC converter.

According to the present invention, the first total power loss and the second total power loss each include power loss in the DC—DC converter, whereby the electric motor selected as the PAM controlled motor can be determined in such a way as to decrease the power loss by comparison in the total power loss of the first inverter, the second inverter, and the DC—DC converter.

According to the second aspect of the present invention, the electric motor control apparatus further comprises a DC—DC converter for transforming an I/O voltage between the battery and each of the inverters, the DC—DC converter being connected to the battery; and, under conditions where at least one of the electric motors acting as the generator is selected as a PAM controlled motor and the inverter connected to the PAM controlled motor is placed in a state to output a DC voltage without voltage transformation using the voltage transformation control unit, a voltage control unit on the driving side for transforming the output voltage of the DC—DC converter to a level which allows a generation of a drive voltage corresponding to a target output of the electric motor acting as the motor with the inverter connected to the electric motor acting as the motor and performing the voltage transformation using the voltage transformation control unit in such a way as to generate the drive voltage corresponding to the target output with the inverter connected to the electric motor acting as the motor.

According to the present invention, the voltage control unit on the driving side transforms the output voltage of the DC—DC converter to a level which allows the generation of the drive voltage, corresponding to the target output of the electric motor acting as the motor, with the inverter connected to the electric motor acting as the motor. Moreover, the voltage control unit on the driving side performs the voltage transformation using the voltage transformation control unit in such a way as to generate the drive voltage corresponding to the target output with the inverter connected to the electric motor acting as the motor. Therefore, there is no need to perform the voltage transformation with the PWM control in the inverter connected to the electric motor selected as the PAM controlled motor to perform power generation and the voltage control unit on the driving side places the inverter connected to the PAM controlled motor in a state to output a DC voltage without voltage transformation using the voltage transformation control unit. This prevents an occurrence of the power loss accompanied by the ON-OFF control action of the switching element with the PWM control in the inverter connected to the PAM controlled motor, thereby enabling a reduction in the total amount of power loss in each inverter in comparison with the case where the PWM control is performed in all of the inverters.

Third and fourth aspects of the present invention relate to an improvement of an electric motor control apparatus comprising at least two electric motors acting as a motor and a generator; an inverter for generating a drive voltage of the electric motor from an input DC voltage and outputting the drive voltage when the electric motor acts as the motor, and converting a generated voltage of the electric motor to a DC voltage and outputting the DC voltage when the electric motor acts as the generator, the inverter being connected between the electric motors; and a voltage transformation control unit for performing a PWM control with an ON-OFF control action of a switching element forming an inverter connected to the electric motor activated as the motor to transform the drive voltage for the electric motor activated as the motor from the inverter, and for performing a PWM control with an ON-OFF control action of a switching element forming an inverter connected to the electric motor activated as the generator to transform the generated voltage of the electric motor activated as the generator.

Moreover, according to the third aspect of the present invention, under conditions where at least one of the electric motors acting as the motor is selected as a PAM controlled motor and the inverter connected to the PAM controlled motor is placed in a state to generate a drive voltage without voltage transformation with the PWM control, the electric motor control apparatus further comprises a voltage control unit on the power generation side for transforming the output voltage of the inverter connected to the electric motor acting as the generator by the voltage transformation control unit in such a way as to input a DC voltage corresponding to a target output of the PAM controlled motor to the inverter connected to the PAM controlled motor.

According to the present invention, the voltage control unit on the power generation side transforms the output voltage of the inverter connected to the electric motor acting as the generator in such a way as to input the DC voltage corresponding to the target output of the electric motor acting as the motor selected as the PAM controlled motor to the PAM controlled motor. Therefore, the inverter connected to the PAM controlled motor can generate a drive voltage corresponding to the target output by the PAM control without voltage transformation using the voltage transformation control unit. This prevents an occurrence of power loss accompanied by the ON-OFF control action of the switching element with the PWM control in the inverter connected to the PAM controlled motor, thereby enabling a reduction in the total amount of power loss in each inverter in comparison with the case where the PWM control is performed in all of the inverters.

Moreover, at least one of the electric motors acting as the generator is selected as a PAM controlled motor and the inverter connected to the PAM controlled motor is placed in a state to output a DC voltage without voltage transformation using the voltage transformation control unit. In this condition, the electric motor control apparatus further comprises a voltage control unit on the driving side for performing voltage transformation using the voltage transformation control unit in such a way as to generate a drive voltage corresponding to a target output of the electric motor acting as the motor with the inverter connected to the electric motor acting as the motor.

According to the present invention, the voltage control unit on the driving side transforms the input voltage to a level which allows a generation of the drive voltage corresponding to the target output of the electric motor acting as the motor with the inverter connected to the electric motor acting as the motor. Therefore, there is no need to perform the voltage transformation with the PWM control in the inverter connected to the electric motor acting as the generator selected as the PAM controlled motor, whereby the voltage control unit on the driving side places the inverter connected to the PAM controlled motor in a state to output a DC voltage without voltage transformation using the voltage transformation control unit. This prevents an occurrence of power loss accompanied by the ON-OFF control action of the switching element with the PWM control in the inverter connected to the PAM controlled motor, thereby enabling a reduction in the total amount of power loss in each inverter in comparison with the case where the PWM control is performed in all of the inverters.

Moreover, preferably the electric motor control apparatus further comprises a PAM controlled motor selecting unit for determining an electric motor to be selected as a PAM controlled motor by comparison between a first total power loss including the total amount of power loss in each inverter when the voltage control unit on the power generation side performed the voltage transformation control with the electric motor acting as the motor being used as the PAM controlled motor, and a second total power loss including the total amount of power loss in each inverter when the voltage control unit on the driving side performed the voltage transformation control with the electric motor acting as the generator being used as the PAM controlled motor.

According to the present invention, the PAM controlled motor selecting unit determines the electric motor selected as the PAM controlled motor by comparison between the first total power loss including the total amount of power loss in each inverter with the electric motor acting as the generator being used as the PAM controlled motor and the second total power loss including the total amount of power loss in each inverter with the electric motor acting as the motor being used as the PAM controlled motor. This enables a determination of the electric motor selected as the PAM controlled motor in such a way as to minimize the total amount of power loss in each inverter.

According to the fourth aspect of the present invention, under conditions where at least one of the electric motors acting as the generator is selected as a PAM controlled motor and the inverter connected to the PAM controlled motor is placed in a state to output a DC voltage without voltage transformation using the voltage transformation control unit, the electric motor control apparatus further comprises a voltage control unit on the driving side for performing voltage transformation using the voltage transformation control unit in such a way as to generate a drive voltage corresponding to a target output of the electric motor acting as the motor with the inverter connected to the electric motor acting as the motor.

According to the present invention, the voltage control unit on the driving side transforms an input voltage to a level which allows a generation of the drive voltage corresponding to the target output of the electric motor acting as the motor with the inverter connected to the electric motor acting as the motor. Therefore, there is no need to perform the voltage transformation with the PWM control in the inverter connected to the electric motor acting as the generator selected as the PAM controlled motor and the voltage control unit on the driving side places the inverter connected to the PAM controlled motor in a state to output a DC voltage without voltage transformation using the voltage transformation control unit. This prevents an occurrence of the power loss accompanied by the ON-OFF control action of the switching element with the PWM control in the inverter connected to the PAM controlled motor, thereby enabling a reduction in the total amount of power loss in each inverter in comparison with the case where the PWM control is performed in all of the inverters.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
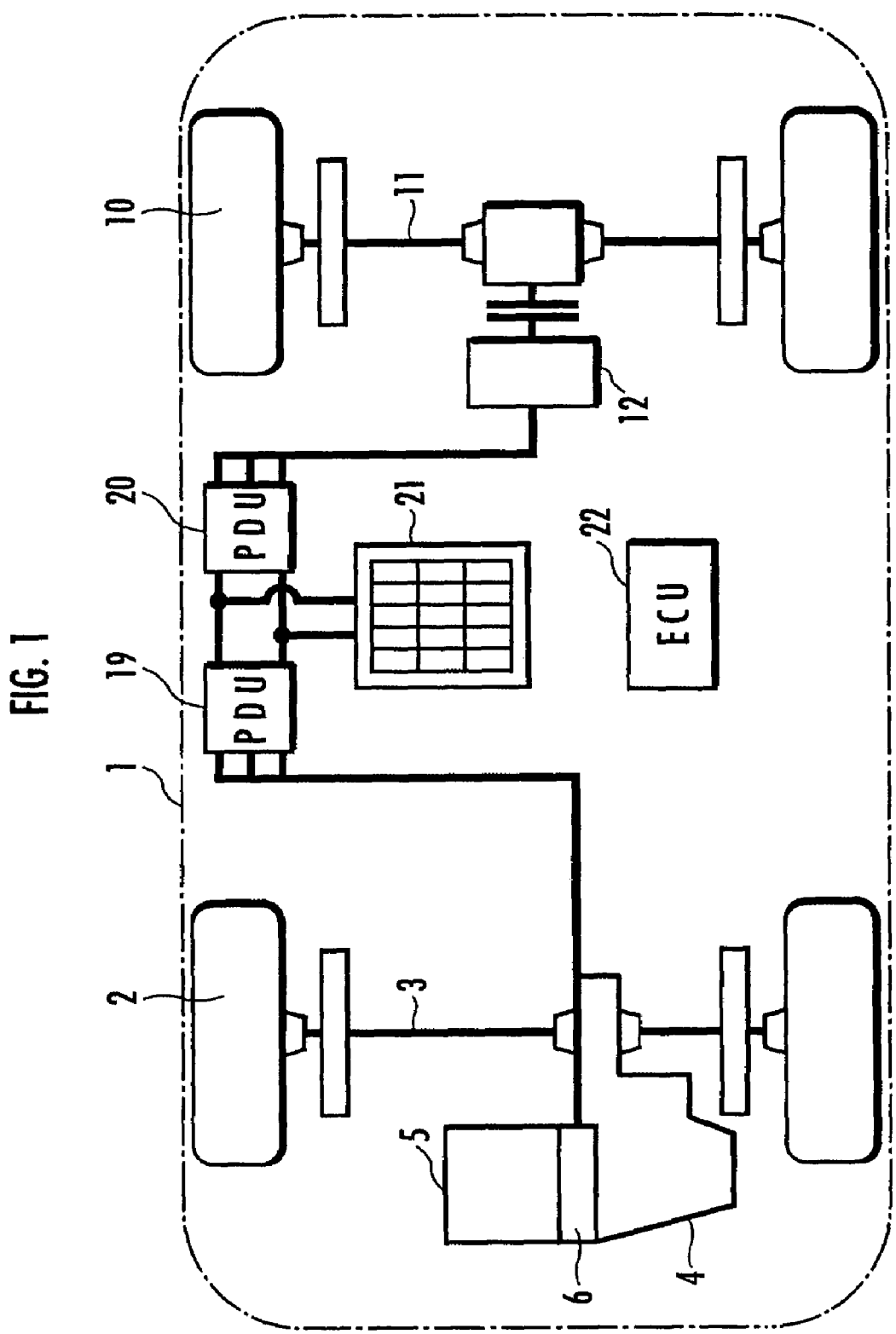
FIG. 1 is a configuration diagram of a hybrid vehicle provided with an electric motor control apparatus of the present invention.
Figure 2:
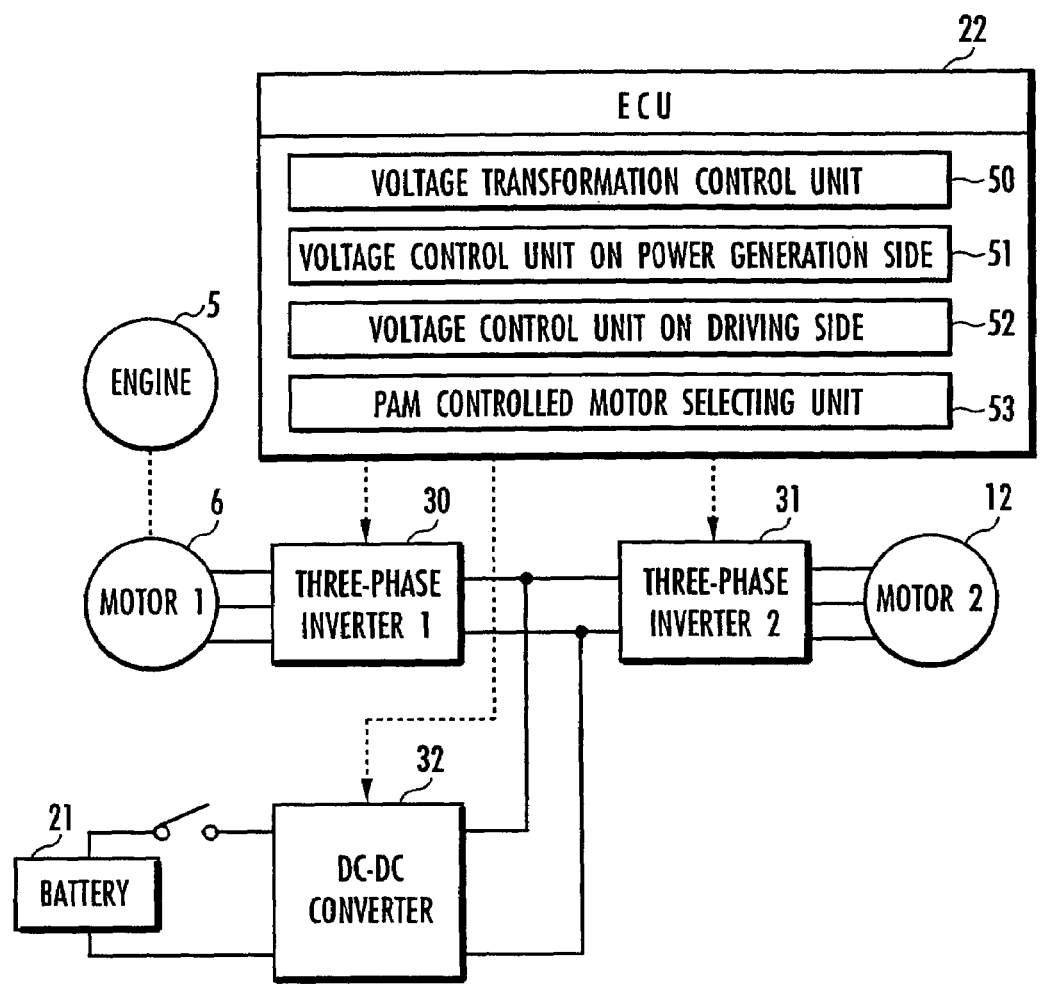
FIG. 2 is a block diagram of an electric motor control apparatus according to a first embodiment.
Figure 3:
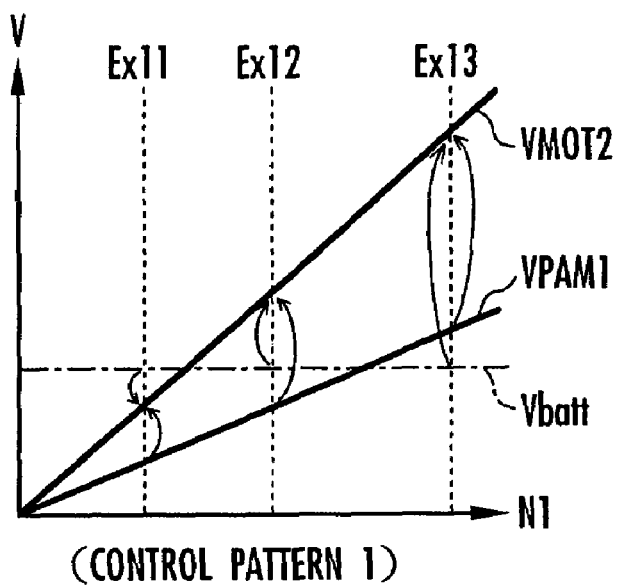
FIG. 3 is a graph showing an aspect of a voltage transformation control in the first embodiment.
Figure 3:
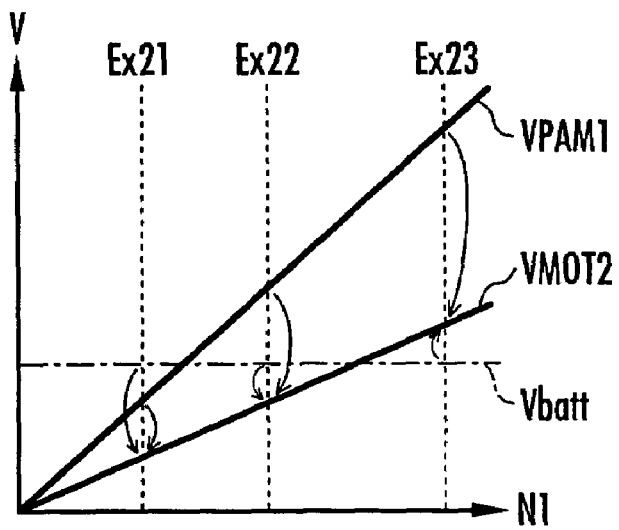
Figure 4:
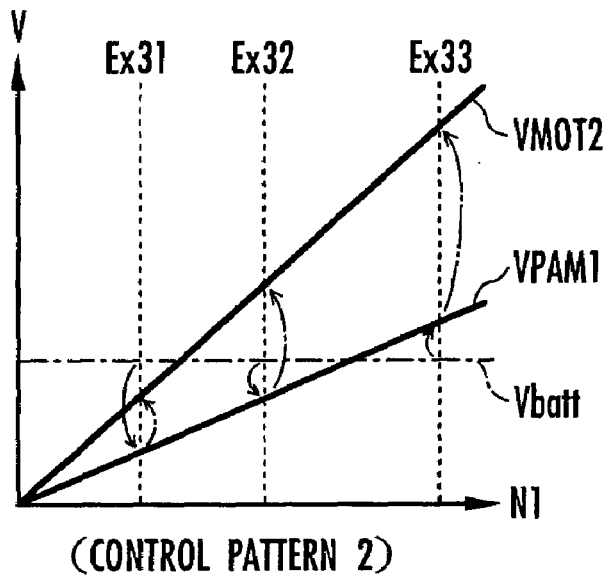
FIG. 4 is a graph showing an aspect of a voltage transformation control in the first embodiment.
Figure 4:
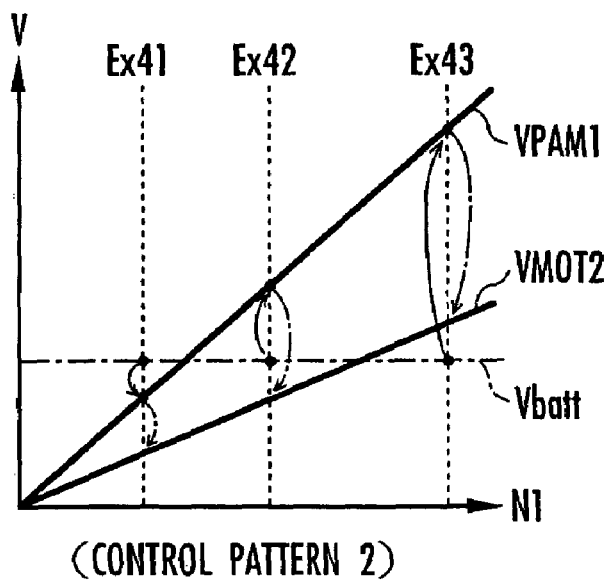
Figure 5:
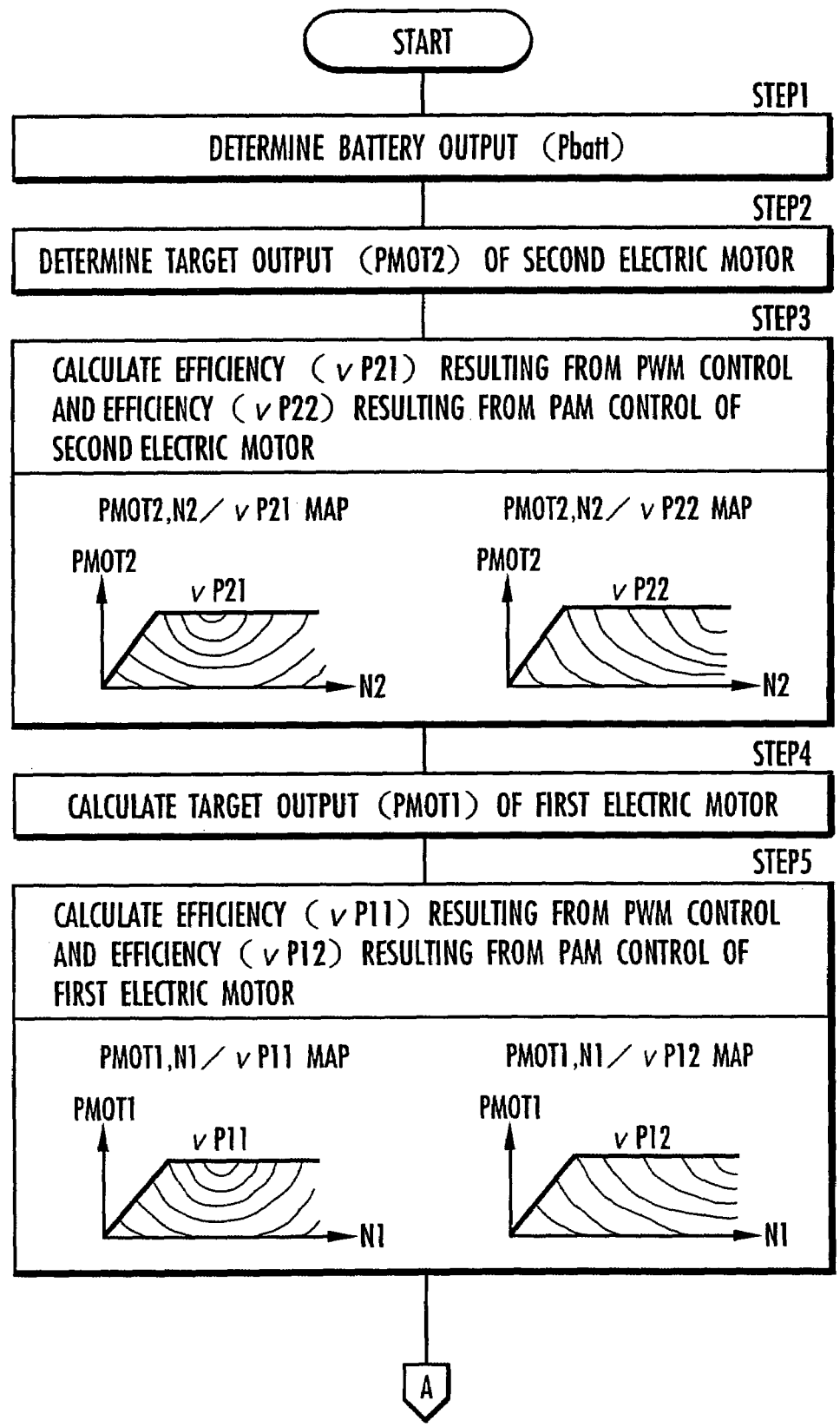
FIG. 5 is a flowchart showing a procedure for selecting a control pattern in the first embodiment.
Figure 6:
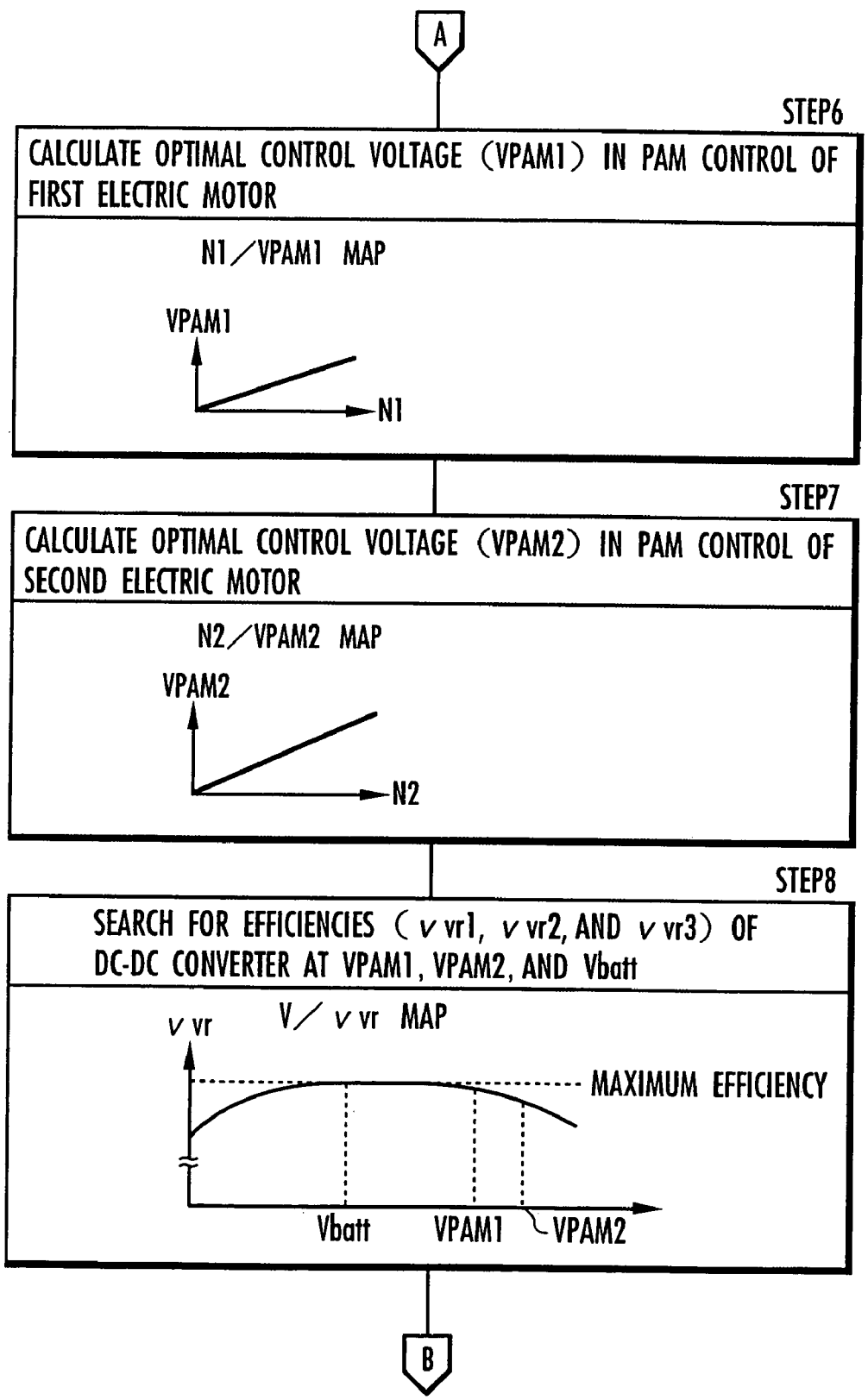
FIG. 6 is a flowchart showing a procedure for selecting a control pattern in the first embodiment.
Figure 7:
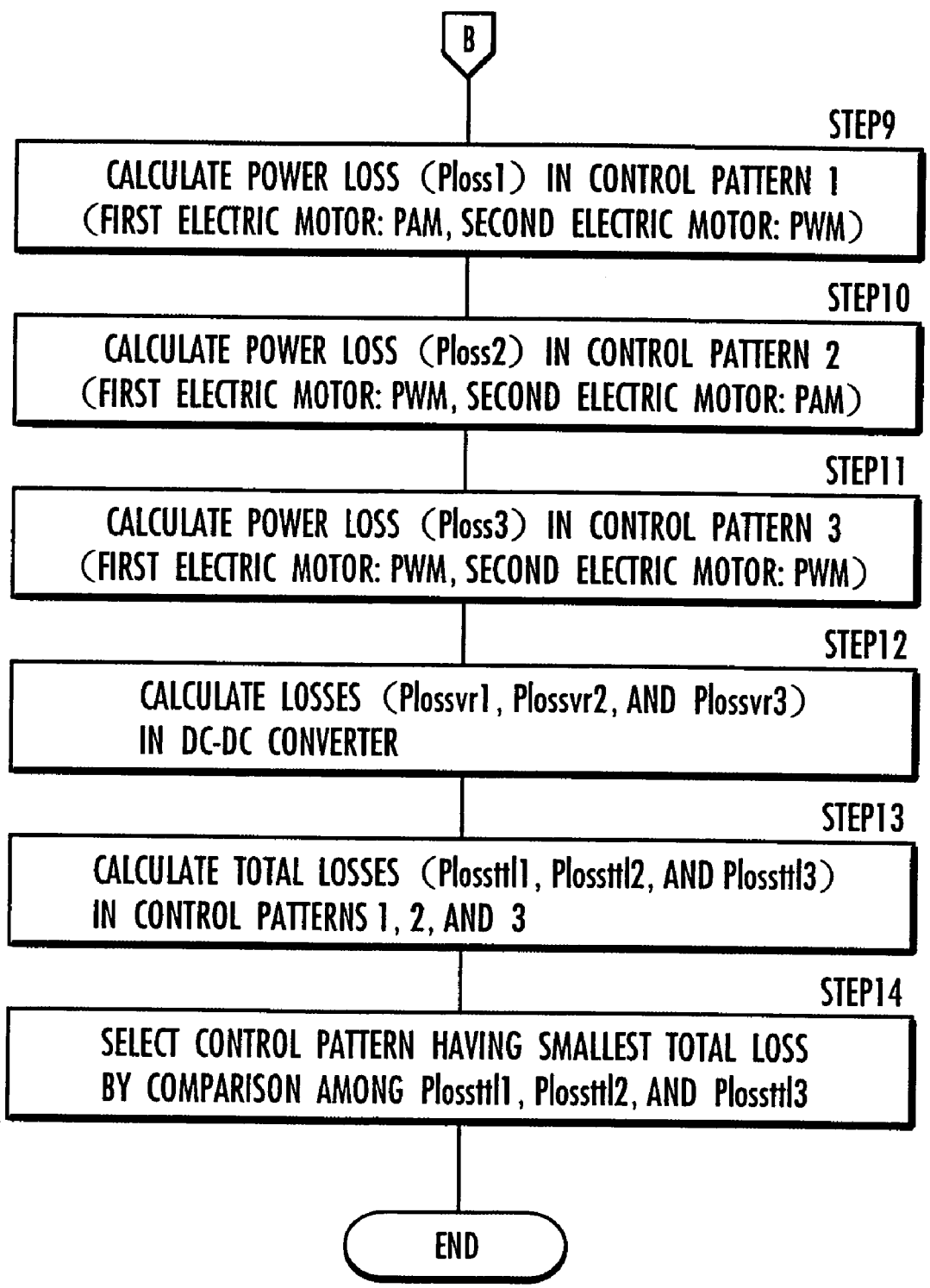
FIG. 7 is a flowchart showing a procedure for selecting a control pattern in the first embodiment.
Figure 8:
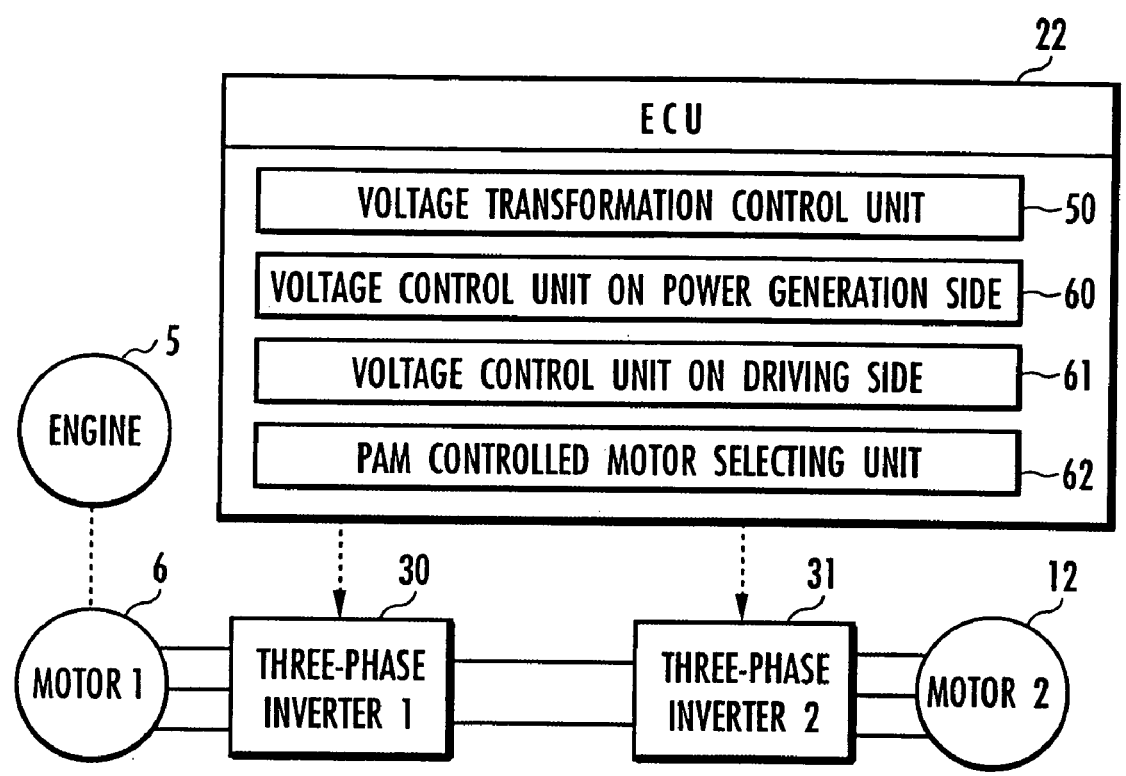
FIG. 8 is a block diagram of an electric motor control apparatus according to a second embodiment.
Figure 9:
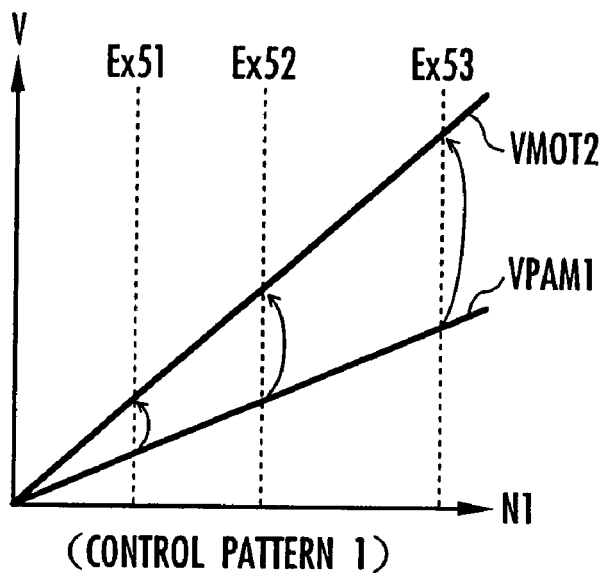
FIG. 9 is a graph showing an aspect of a voltage transformation control in the second embodiment.
Figure 9:
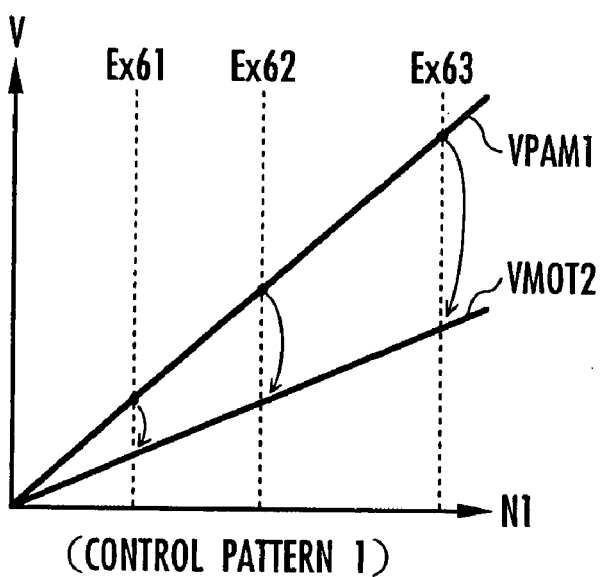
Figure 10:
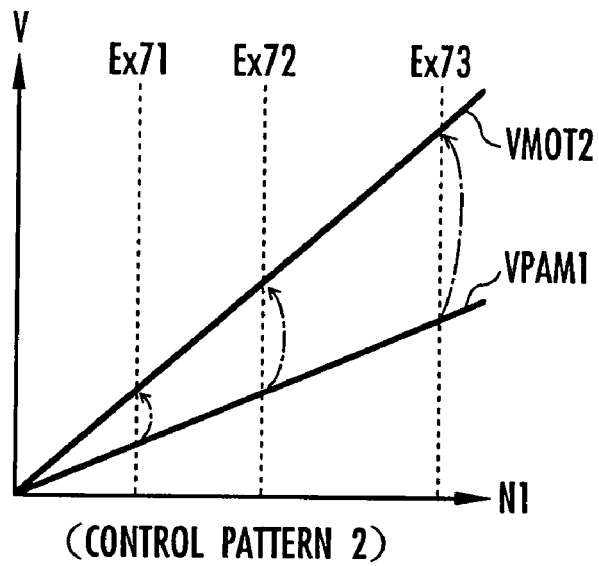
FIG. 10 is a graph showing an aspect of a voltage transformation control in the second embodiment.
Figure 10:
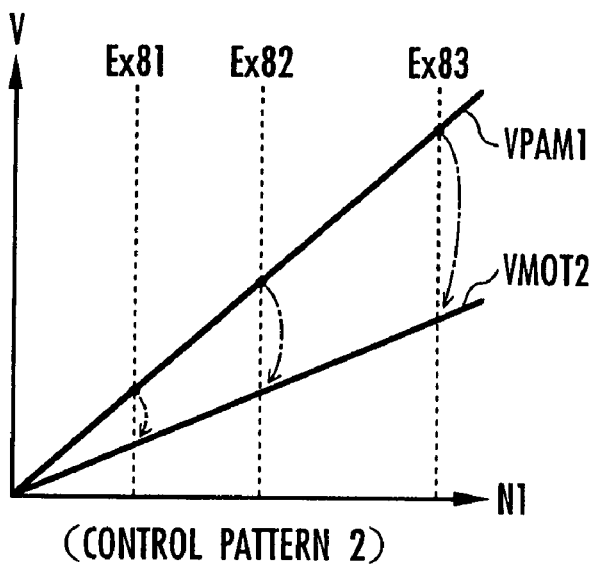
Figure 11:
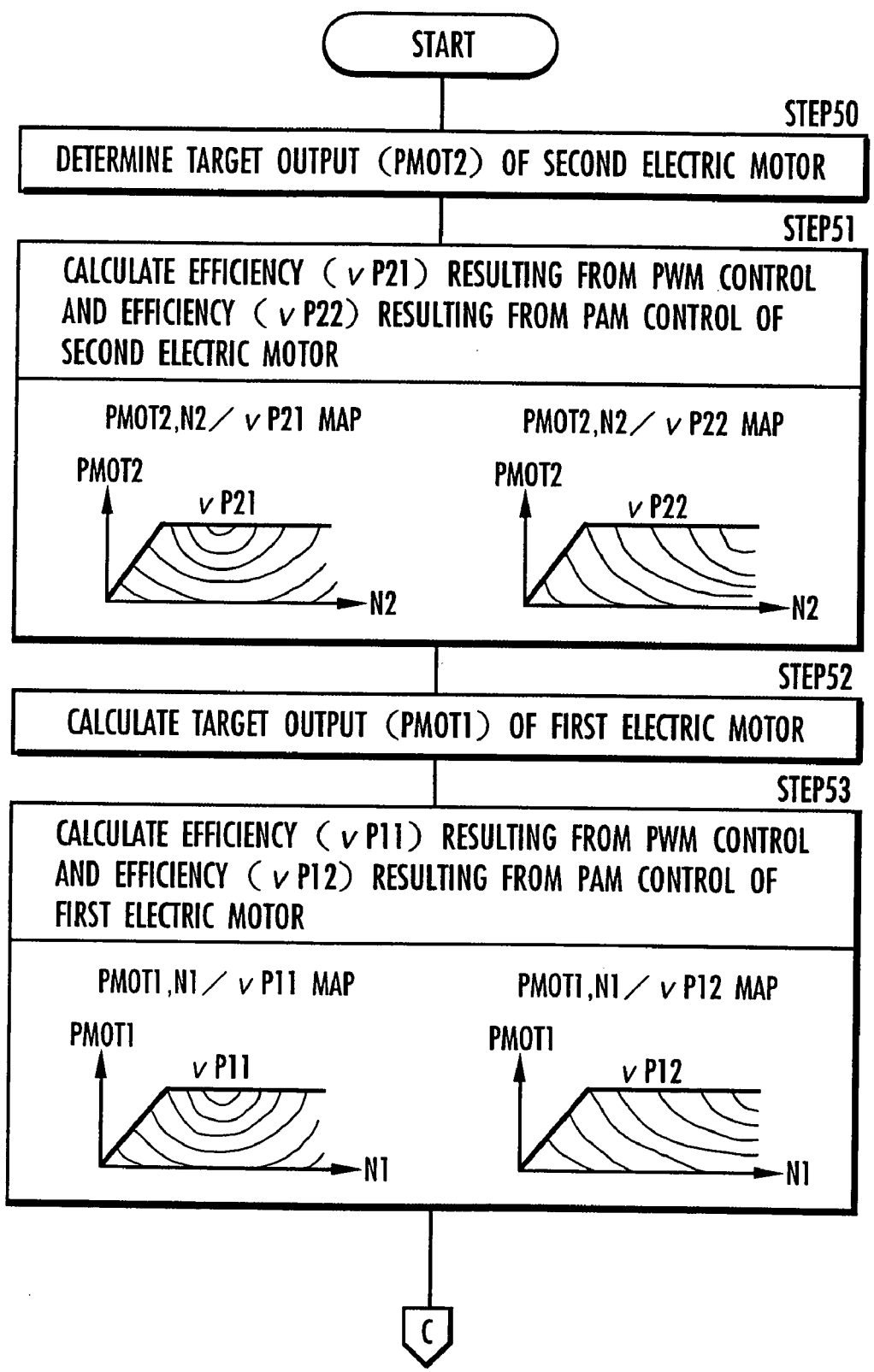
FIG. 11 is a flowchart showing a procedure for selecting a control pattern in the second embodiment.
Figure 12:
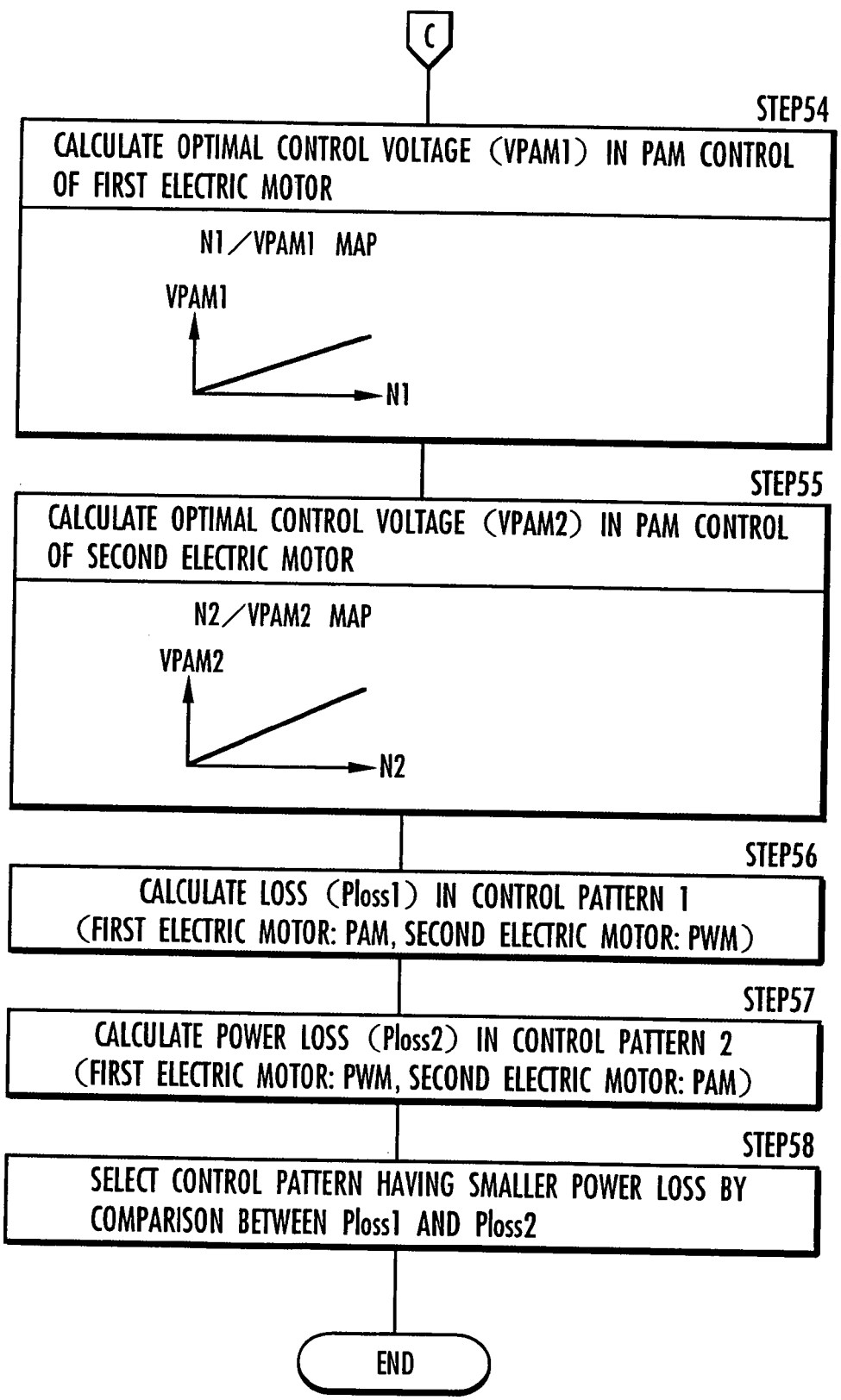
FIG. 12 is a flowchart showing a procedure for selecting a control pattern in the second embodiment.
Figure 13:
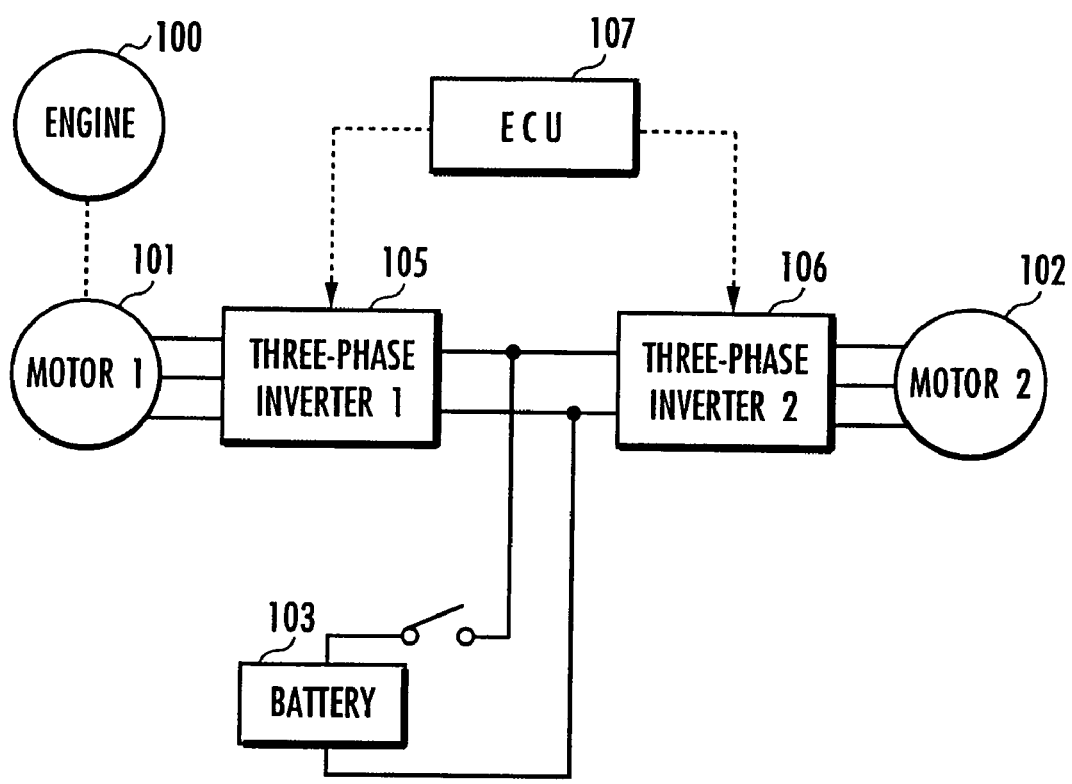
FIG. 13 is a block diagram of a conventional electric motor control apparatus.

The preferred embodiments of the present invention will now be described hereinafter with reference to FIG. 1 to FIG. 12. FIG. 1 shows a configuration diagram of a hybrid vehicle provided with an electric motor control apparatus of the present invention. FIG. 2 shows a block diagram of an electric motor control apparatus according to a first embodiment. FIG. 3 and FIG. 4 illustrate graphs showing aspects of voltage transformation control in the first embodiment. FIG. 5 to FIG. 7 are flowcharts each showing a procedure for selecting a control pattern in the first embodiment. FIG. 8 shows a block diagram of an electric motor control apparatus according to a second embodiment. FIG. 9 and FIG. 10 are graphs showing aspects of voltage transformation control in the second embodiment. FIG. 11 and FIG. 12 are flowcharts each showing a procedure for selecting a control pattern in the second embodiment.

Referring to FIG. 1, a hybrid vehicle 1 is provided with an engine 5 and a first electric motor 6 for driving front wheels 2, and outputs of the engine 5 and the first electric motor 6 are transmitted to the front wheels 2 via a transmission 4. In addition, the hybrid vehicle 1 is provided with a second electric motor 12 for driving rear wheels 10, and the first electric motor 6 and the second electric motor 12 act as a motor and a generator.

Then, a three-phase inverter provided in a first power drive unit (PDU) 19 generates a drive voltage for the first electric motor 6 and collects generated outputs of the first electric motor 6. In addition, a three-phase inverter provided in a second PDU 20 generates a drive voltage for the second electric motor 12 and collects generated outputs of the second electric motor 12. Moreover, the hybrid vehicle 1 is provided with an electronic control unit 22 for controlling an entire operation of the hybrid vehicle 1 and a battery 21.

Hereinafter, the first embodiment and the second embodiment of the electric motor control apparatus according to the present invention will be described by giving an example where the first electric motor 6 is operated as a generator and the second electric motor 12 is operated as a motor.

First Embodiment

Referring to FIG. 2, the electric motor control apparatus according to the first embodiment comprises the first electric motor 6, the second electric motor 12, a first inverter 30, a second inverter 31, the battery 21, a DC—DC converter 32, and an ECU 22 in the first embodiment. The battery 21 is then connected to the first inverter 30 and the second inverter 31 via the DC—DC converter 32 and control signals output from the ECU 22 control the operations of the first inverter 30, the second inverter 31, and the DC—DC converter 32.

When the electric motor 6 acts as a motor, the first inverter 30 generates a three-phase drive voltage from a DC voltage input from the DC—DC converter 32 or the second inverter 31 and outputs the drive voltage to the first electric motor 6. When the first electric motor 6 acts as a generator, the first inverter 30 converts a three-phase generated voltage input from the first electric motor 6 to a DC voltage and outputs the DC voltage to the DC—DC converter 32 and the second inverter 31. Moreover, a PWM control with an ON-OFF control action of a switching element (not shown) forming the first inverter 30 is performed to transform the drive voltage for the first electric motor 6 and the output voltage for the DC—DC converter 32 and the second inverter 31.

Similarly, when the second electric motor 12 acts as a motor, the second inverter 31 generates a three-phase drive voltage from a DC voltage input from the DC—DC converter 32 or the first inverter 30 and outputs the drive voltage to the second electric motor 12. When the second electric motor 12 acts as a generator, the second inverter 31 converts a three-phase generated voltage input from the second electric motor 12 to a DC voltage and outputs the DC voltage to the DC—DC converter 32 and the first inverter 30. Moreover, a PWM control with an ON-OFF control action of a switching element (not shown) forming the second inverter 31 is performed to transform the drive voltage for the second electric motor 12 and the output voltage for the DC—DC converter 32 and the first inverter 30.

The ECU 22 includes a voltage transformation control unit 50, a voltage control unit on the power generation side 51, a voltage control unit on the driving side 52, and a PAM controlled motor selecting unit 53.

The voltage transformation control unit 50 changes duties (proportions of the ON period of the switching element in a predetermined cycle) of the PWM controls in the first inverter 30 and the second inverter 31 to transform the drive voltages output from the first inverter 30 and the second inverter 31 and to transform the DC voltages output from the first inverter 30 and the second inverter 31.

When the first electric motor 6 is operated as a generator and the second electric motor 12 is operated as a motor, the voltage control unit on the power generation side 51 executes "control pattern 1" for transforming the generated voltage of the first electric motor 6 with the PWM control by using the first inverter 30, transforming the output voltage of the battery 21 by using the DC—DC converter 32, and thereby changing the drive voltage for the second electric motor 12 with the PAM control by using the second inverter 31.

When the control pattern 1 is executed, there is no occurrence of power loss with the ON-OFF control action of the switching element accompanied by the PWM control in the second inverter 31. Therefore, the total amount of power loss can be decreased in the first inverter 30 and the second inverter 31 in comparison with the case where the PWM control is performed in both of the first inverter 30 and the second inverter 31. In this regard, the second electric motor 12 is the PAM controlled motor of the present invention in the control pattern 1.

More specifically, the voltage control unit on the power generation side 51 places the second inverter 31 in a PAM control state to generate a drive voltage without voltage transformation with the PWM control. Then, the voltage control unit on the power generation side 51 controls an output voltage of the DC—DC converter 32 and controls an output voltage of the first inverter 30 with the PWM control so that the second inverter 31 receives an input of a DC voltage having a level which allows a generation of a drive voltage corresponding to a target output of the second electric motor 12.

FIG. 3(a) and FIG. 3(b) are graphs showing relations among a required voltage VMOT2 (a voltage corresponding to the target output) of the second electric motor 12, a generated voltage VPAM1 of the first electric motor 6, and an output voltage Vbatt of the battery 21 when the control pattern 1 has been executed as stated above.

Referring to FIG. 3(*a*), there is shown a condition where the required voltage VMOT2 of the second electric motor 12 is higher than the generated voltage VPAM1 of the first electric motor 6, showing "VPAM1<VMOT2<Vbatt" at Ex11, "VPAM1<Vbatt<VMOT2" at Ex12, and "Vbatt<VPAM1<VMOT2" at Ex13.

At Ex11, the DC—DC converter 32 decreases the output voltage Vbatt of the battery 21 to the required voltage VMOT2 of the second electric motor 12 and the first inverter 30 increases the generated voltage VPAM1 of the first electric motor 6 to the required voltage VMOT2 of the second electric motor 12.

At Ex12 and Ex13, the DC—DC converter 32 increases the output voltage Vbatt of the battery 21 to the required voltage VMOT2 of the second electric motor 12 and the first inverter 30 increases the generated voltage VPAM1 of the first electric motor 6 to the required voltage VMOT2 of the second electric motor 12.

Referring to FIG. 3(*b*), there is shown a condition where the control pattern 1 has been executed when the required voltage VMOT2 of the second electric motor 12 is lower than the generated voltage VPAM1 of the first electric motor 6, showing "VMOT2<VPAM1<Vbatt" at Ex21, "VMOT2<Vbatt<VPAM1" at Ex22, and "Vbatt<VMOT2<VPAM1" at Ex23.

At Ex21 and Ex22, the DC—DC converter 32 decreases the output voltage Vbatt of the battery 21 to the required voltage VMOT2 of the second electric motor 12 and the first inverter 30 decreases the generated voltage VPAM1 of the first electric motor 6 to the required voltage VMOT2 of the second electric motor 12.

At Ex23, the DC—DC converter 32 increases the output voltage Vbatt of the battery 21 to the required voltage VMOT2 of the second electric motor 12 and the first inverter 30 decreases the generated voltage VPAM1 of the first electric motor 6 to the required voltage VMOT2 of the second electric motor 12.

Subsequently, when the first electric motor 6 is operated as a generator and the second electric motor 12 is operated as a motor, the voltage control unit on the driving side 52 executes "control pattern 2" for directly outputting a DC voltage rectified from the generated voltage of the first electric motor 6 in the first inverter 30 without voltage transformation with the PWM control, transforming an output voltage of the battery 21 by using the DC—DC converter 32, and generating a drive voltage for the second electric motor 12 by performing voltage transformation with the PWM control by using the second inverter 31.

When the control pattern 2 is executed, there is no occurrence of power loss caused by the ON-OFF control action of the switching element accompanied by the PWM control in the first inverter 30. Therefore, the total amounts of power loss in the first inverter 30 and the second inverter 31 can be reduced in comparison with the case where the PWM control is performed in both of the first inverter 30 and the second inverter 31. In the control pattern 2, the first electric motor 6 is the PAM controlled motor of the present invention.

More specifically, the voltage control unit on the driving side 52 places the first inverter 30 in a PAM control state to directly output the DC voltage rectified from the generated voltage of the first electric motor 6 without voltage transformation with the PWM control. Then, the voltage control unit on the driving side 52 controls an output voltage of the DC—DC converter 32 and controls a drive voltage output from the second inverter 31 with the PWM control so that the second inverter 31 receives an input of the DC voltage having a level which allows a generation of a drive voltage corresponding to a target output of the second electric motor 12.

FIG. 4(*a*) and FIG. 4(*b*) are graphs showing relations among a required voltage VMOT2 (a voltage corresponding to the target output) of the second electric motor 12, a generated voltage VPAM1 of the first electric motor 6, and an output voltage Vbatt of the battery 21 when the control pattern 2 has been executed as stated above.

Referring to FIG. 4(*a*), there is shown a condition where the required voltage VMOT2 of the second electric motor 12 is higher than the generated voltage VPAM1 of the first electric motor 6, showing "VPAM1<VMOT2<Vbatt" at Ex31, "VPAM1<Vbatt<VMOT2" at Ex32, and "Vbatt<VPAM1<VMOT2" at Ex33.

At Ex31 and Ex32, the DC—DC converter 32 decreases the output voltage Vbatt of the battery 21 to the generated voltage VPAM1 of the first electric motor 6 and the second inverter 31 increases the generated voltage VPAM1 of the first electric motor 6 to the required voltage VMOT2 of the second electric motor 12.

At Ex33, the DC—DC converter 32 increases the output voltage Vbatt of the battery 21 to the generated voltage VPAM1 of the first electric motor 6 and the second inverter 31 increases the generated voltage VPAM1 of the first electric motor 6 to the required voltage VMOT2 of the second electric motor 12.

Referring to FIG. 4(*b*), there is shown a condition where the control pattern 2 is executed when the required voltage VMOT2 of the second electric motor 12 is lower than the generated voltage VPAM1 of the first electric motor 6, showing "VMOT2<VPAM1<Vbatt" at Ex41, "VMOT2<Vbatt<VPAM1" at Ex42, and "Vbatt<VMOT2<VPAM1" at Ex43.

At Ex41, the DC—DC converter 32 decreases the output voltage Vbatt of the battery 21 to the generated voltage VPAM1 of the first electric motor 6 and the second inverter 31 decreases the generated voltage VPAM1 of the first electric motor 6 to the required voltage VMOT2 of the second electric motor 12.

At Ex42 and Ex43, the DC—DC converter 32 increases the output voltage Vbatt of the battery 21 to the generated voltage VPAM1 of the first electric motor 6 and the second inverter 31 decreases the generated voltage VPAM1 of the first electric motor 6 to the required voltage VMOT2 of the second electric motor 12.

Subsequently, the PAM controlled motor selecting unit 53 determines which of the control pattern 1, the control pattern 2, and control pattern 3 for performing a PWM control in both of the first inverter 30 and the second inverter 31 should be executed by estimating the total power loss. Hereinafter, the procedure for selecting the control pattern using the PAM controlled motor selecting unit 53 will be described with reference to flowcharts shown in FIG. 5 to FIG. 7.

The PAM controlled motor selecting unit 53 first determines electric power Pbatt that can be output from the battery 21 in step 1 shown in FIG. 5. Then, in the next step 2, it determines a target output PMOT2 of the second electric motor 12 according to the operating state of the hybrid vehicle 1.

In the next step 3, the PAM controlled motor selecting unit 53 calculates an efficiency vP21 resulting from an execution of the PWM control of the second inverter 31 by applying the target output PMOT2 of the second electric motor 12 and the number of revolutions N2 of the second electric motor 12 to the shown PMOT2, N2/vP21 MAP. Moreover, the PAM controlled motor selecting unit 53 calculates an efficiency vP22 resulting from an execution of the PAM control of the second inverter 31 by applying the target output PMOT2 of the second electric motor 12 and the number of revolutions N2 of the second electric motor 12 to the shown PMOT2, N2/vP22 MAP.

In the next step 4, the PAM controlled motor selecting unit 53 calculates a target output PMOT1 of the first electric motor 6 by the following formula (1):

$$PMOT1=PMOT2-Pbatt \quad (1)$$

where PMOT2 is the target output of the second electric motor 12 and Pbatt is the output power of the battery.

Then, in step 5, the PAM controlled motor selecting unit 53 calculates an efficiency vP11 resulting from an execution of the PWM control of the first inverter 30 by applying the target output PMOT1 of the first electric motor 6 and the number of revolutions N1 of the first electric motor 6 to the shown PMOT1, N1/vP11 MAP. Moreover, the PAM controlled motor selecting unit 53 calculates an efficiency vP12 resulting from an execution of the PAM control of the first inverter 30 by applying the target output PMOT1 of the first electric motor 6 and the number of revolutions N1 of the first electric motor 6 to the shown PMOT1, N1/P12 MAP.

In the next step 6 shown in FIG. 6, the PAM controlled motor selecting unit 53 calculates an optimal control voltage VPAM1 in the PAM control of the first inverter 30 by applying the number of revolutions N1 of the first electric motor 6 to the shown N1/VPAM1 MAP. Furthermore, in step 7, the PAM controlled motor selecting unit 53 calculates an optimal control voltage VPAM2 in the PAM control of the second inverter 31 by applying the number of revolutions N2 of the second electric motor 12 to the shown N2/VPAM2 MAP.

Furthermore, in the next step 8, the PAM controlled motor selecting unit 53 applies the optimal control voltage VPAM1 of the first electric motor 6, the optimal control voltage VPAM2 of the second electric motor 12, and the output voltage Vbatt of the battery 21 to the shown V/vvr MAP to calculate efficiencies vvr1, vvr2, and vvr3 of the DC—DC converter 32 at the respective voltages.

Then, in the next step 9 shown in FIG. 7, the PAM controlled motor selecting unit 53 calculates power loss Ploss1 in the first inverter 30 and the second inverter 31 in the control pattern 1 by the following formula (2):

$$Ploss1=PMOT1 \times vP12+PMOT2 \times vP21 \quad (2)$$

Similarly, in step 10 the PAM controlled motor selecting unit 53 calculates power loss Ploss2 in the first inverter 30 and the second inverter 31 in the control pattern 2 by the following formula (3) and in step 11 the PAM controlled motor selecting unit 53 calculates power loss Ploss3 in the first inverter 30 and the second inverter 31 in the control pattern 3 by the following formula (4):

$$Ploss2=PMOT1 \times vP11+PMOT2 \times vP22 \quad (3)$$

$$Ploss3=PMOT1 \times vP11+PMOT2 \times vP21 \quad (4)$$

Furthermore, in the next step 12 the PAM controlled motor selecting unit 53 calculates power losses Plossvr1, Plossvr2, Plossvr3 of the DC—DC converter 32 at the optimal control voltage VPAM1 of the first electric motor 6, the optimal control voltage VPAM2 of the second electric motor 12, and the output voltage Pbatt of the battery 21 by the following formula (5) to formula (7):

$$Plossvr1=Pbatt \times vvr1 \quad (5)$$

$$Plossvr2=Pbatt \times vvr2 \quad (6)$$

$$Plossvr3=Pbatt \times vvr3 \quad (7)$$

Then, in step 13, the PAM controlled motor selecting unit 53 calculates total loss Plosstt11 (corresponding to the first total power loss of the present invention) resulting from an execution of the control pattern 1, total loss Plosstt12 (corresponding to the second total power loss of the present invention) resulting from an execution of the control pattern 2, and total loss Plosstt13 resulting from an execution of the control pattern 3 by the following formula (8) to formula (10):

$$Plosstt11=Ploss1+Plossvr1 \quad (8)$$

$$Plosstt12=Ploss2+Plossvr2 \quad (9)$$

$$Plosstt13=Ploss3+Plossvr3 \quad (10)$$

In the next step 14, the PAM controlled motor selecting unit 53 selects the control pattern having the smallest total loss by comparison among Plosstt11, Plosstt12, and Plosstt13 and determines the electric motor to be PAM-controlled (PAM controlled motor) according to the selected control pattern.

In the first embodiment, the total power loss has been calculated including the power losses Plossvr1, Plossvr2, and Plossvr3 in the DC—DC converter 32. The effect of the present invention, however, can also be achieved by calculating the total power loss without including the power losses in the DC—DC converter 32.

Second Embodiment

Referring to FIG. 8, an electric motor control apparatus according to the present invention comprises a first electric motor 6, a second electric motor 12, a first inverter 30, a second inverter 31, and an ECU 22 in a second embodiment. Then, the first inverter 30 is connected to the second inverter 31 and control signals output from the ECU 22 control the operations of the first inverter 30 and the second inverter 31. The same reference characters have been used as in FIG. 3 for the same parts as in the control block diagram in the first embodiment shown in FIG. 3 and their description is omitted here.

When the first electric motor 6 is operated as a generator and the second electric motor 12 is operated as a motor, the voltage control unit on the power generation side 60 in the second embodiment executes "control pattern 1" for transforming a generated voltage of the first electric motor 6 with the PWM control by using the first inverter 30 and thereby changing a drive voltage for the second electric motor 12 with the PAM control by using the second inverter 31.

If the control pattern 1 is executed, there is no occurrence of power loss with the ON-OFF control action of the switching element accompanied by the PWM control in the second inverter 31. Therefore, the total amount of power loss can be decreased in the first inverter 30 and the second inverter 31. In this regard, the second electric motor 12 is the PAM controlled motor of the present invention in the control pattern 1.

More specifically, the voltage control unit on the power generation side 60 places the second inverter 31 in a PAM control state to generate a drive voltage without voltage transformation with the PWM control. Then, the voltage control unit on the power generation side 60 controls an output voltage of the first inverter 30 with the PWM control so that the second inverter 31 receives an input of a DC voltage having a level which allows a generation of a drive voltage corresponding to a target output of the second electric motor 12.

FIG. 9(a) and FIG. 9(b) are graphs showing relations between a required voltage VMOT2 (a voltage corresponding to the target output) of the second electric motor 12 and a generated voltage VPAM1 of the first electric motor 6 when the control pattern 1 has been executed as stated above.

Referring to FIG. 9(a), there is shown a condition where the required voltage VMOT2 of the second electric motor 12 is higher than the generated voltage VPAM1 of the first electric motor 6 (VPAM1<VMOT2), showing that the first inverter 30 increases the generated voltage VPAM1 of the first electric motor 6 to the required voltage VMOT2 of the second electric motor 12 at Ex51, Ex52, and Ex53.

Referring to FIG. 9(b), there is shown a condition where the required voltage VMOT2 of the second electric motor 12 is lower than the generated voltage VPAM1 of the first electric motor 6 (VPAM1>VMOT2), showing that the first inverter 30 decreases the generated voltage VPAM1 of the first electric motor 6 to the required voltage VMOT2 of the second electric motor 12 at Ex61, Ex62, and Ex63.

Subsequently, when the first electric motor 6 is operated as a generator and the second electric motor 12 is operated as a motor, a voltage control unit on the driving side 61 in the second embodiment executes "control pattern 2" for directly outputting a DC voltage rectified from the generated voltage of the first electric motor 6 in the first inverter 30 without voltage transformation with the PWM control and generating a drive voltage for the second electric motor 12 by performing voltage transformation with the PWM control using the second inverter 31.

When the control pattern 2 is executed, there is no occurrence of power loss caused by the ON-OFF control action of the switching element accompanied by the PWM control in the first inverter 30. Therefore, the total amounts of power loss in the first inverter 30 and the second inverter 31 can be reduced in comparison with the case where the PWM control is performed in both of the first inverter 30 and the second inverter 31. In the control pattern 2, the first electric motor 6 is the PAM controlled motor of the present invention.

More specifically, the voltage control unit on the driving side 61 places the first inverter 30 in a state to directly output the DC voltage rectified from the generated voltage of the first electric motor 6 without voltage transformation with the PWM control. Then, the voltage control unit on the driving side 61 controls a drive voltage output from the second inverter 31 with the PWM control so that the second electric motor 12 is supplied with a drive voltage corresponding to the target output.

FIG. 10(a) and FIG. 10(b) are graphs showing relations between a required voltage VMOT2 (a voltage corresponding to the target output) of the second electric motor 12 and a generated voltage VPAM1 of the first electric motor 6 when the control pattern 2 has been executed as stated above.

Referring to FIG. 10(a), there is shown a condition where the required voltage VMOT2 of the second electric motor 12 is higher than the generated voltage VPAM1 of the first electric motor 6 (VPAM1<VMOT2), showing that the second inverter 31 increases the generated voltage VPAM1 of the first electric motor 6 to the required voltage VMOT2 of the second electric motor 12 at Ex71, Ex72, and Ex73.

Referring to FIG. 10(b), there is shown a condition where the required voltage VMOT2 of the second electric motor 12 is lower than the generated voltage VPAM1 of the first electric motor 6 (VMOT2<VPAM1), showing that the second inverter 31 decreases the generated voltage VPAM1 of the first electric motor 6 to the required voltage VMOT2 of the second electric motor 12 at Ex81, Ex82, and Ex83.

Subsequently, the PAM controlled motor selecting unit 62 in the second embodiment determines which of the control pattern 1 and the control pattern 2 should be executed by estimating the total power loss. Hereinafter, the procedure for selecting the control pattern by the PAM controlled motor selecting unit 62 will be described with reference to flowcharts shown in FIG. 11 and FIG. 12.

The PAM controlled motor selecting unit 62 first determines the target output PMOT2 of the second electric motor 12 in step 50 shown in FIG. 11. Then, in step 51, it calculates an efficiency vP21 resulting from an execution of the PWM control of the second inverter 31 and an efficiency vP22 resulting from an execution of the PAM control of the second inverter 31 similarly to step 3 in FIG. 5 in the above first embodiment.

Furthermore, in step 52 and step 53, the PAM controlled motor selecting unit 62 calculates an efficiency vP11 resulting from an execution of the PWM control of the first inverter 30 and an efficiency vP12 resulting from an execution of the PAM control of the first inverter 30 similarly to step 4 and step 5 shown in FIG. 5 in the above first embodiment.

Moreover, in step 54 and step 55 shown in FIG. 12, the PAM controlled motor selecting unit 62 calculates an optimal control voltage VPAM1 in the PAM control of the first inverter 30 and an optimal control voltage VPAM2 in the PAM control of the second inverter 31 similarly to step 6 and step 7 in FIG. 6 in the above first embodiment.

Subsequently in the next step 56, the PAM controlled motor selecting unit 62 calculates a total power loss Ploss1 (corresponding to the first total power loss of the present invention) in the first inverter 30 and the second inverter 31 in the control pattern 1 by the aforementioned formula (2). Furthermore, in step 57, it calculates a total power loss Ploss2 (corresponding to the second total power loss of the present invention) in the first inverter 30 and the second inverter 31 in the control pattern 2 by the aforementioned formula (3).

Subsequently in the next step 58, the PAM controlled motor selecting unit 62 selects a control pattern having the smaller total power loss by comparison between Ploss1 and Ploss2 and determines an electric motor (PAM controlled motor) to be PAM-controlled according to the selected control pattern.

While the electric motor control apparatus according to the present invention has been described by giving an example of a configuration in which the electric motor control apparatus is provided in a hybrid vehicle in the first embodiment and the second embodiment, embodiments of the present invention are not limited thereto. On the contrary, the present invention is applicable to any configuration only if it causes two or more electric motors to act as a generator and a motor in cooperation with each other.

For example, while the vehicle is provided with one electric motor for driving the front wheels and one electric motor for driving the rear wheels in the first embodiment and the second embodiment described above, the present invention is also applicable to a vehicle provided with two electric motors for driving the front wheels.

What is claimed is:

1. An electric motor control apparatus, comprising:
   at least two electric motors acting as a motor and a generator;
   a battery;
   an inverter for generating a drive voltage of the electric motor from an input DC voltage and outputting the drive voltage when the electric motor acts as the motor and converting a generated voltage of the electric motor to a DC voltage and outputting the DC voltage when the electric motor acts as the generator, the inverter being connected between each of the electric motors and the battery;
   a voltage transformation control unit for performing a PWM control with an ON-OFF control action of a switching element forming an inverter connected to the electric motor activated as the motor to transform the drive voltage for the electric motor activated as the motor from the inverter, and for performing a PWM control with an ON-OFF control action of a switching element forming an inverter connected to the electric motor activated as the generator to transform the generated voltage of the electric motor activated as the generator;
   a DC—DC converter for transforming an I/O voltage between the battery and each of the inverters, the DC—DC converter being connected to the battery; and
   under conditions where at least one of the electric motors acting as the motor is selected as a PAM controlled motor and the inverter connected to the PAM controlled motor is placed in a state to generate a drive voltage without voltage transformation using the voltage transformation control unit,
   a voltage control unit on the power generation side for transforming the output voltage of the inverter connected to the electric motor acting as the generator using the voltage transformation control unit, and transforming the output voltage of the DC—DC converter in such a way as to input a DC voltage corresponding to a target output of the PAM controlled motor to the inverter connected to the PAM controlled motor.

2. The electric motor control apparatus according to claim 1, further comprising,
   under conditions where at least one of the electric motors acting as the generator is selected as a PAM controlled motor and the inverter connected to the PAM controlled motor is placed in a state to output a DC voltage without voltage transformation using the voltage transformation control unit,
   a voltage control unit on the driving side for transforming the output voltage of the DC—DC converter to a level which allows a generation of a drive voltage corresponding to a target output of the electric motor acting as the motor with the inverter connected to the electric motor acting as the motor and for performing the voltage transformation using the voltage transformation control unit in such a way as to generate the drive voltage corresponding to the target output with the inverter connected to the electric motor acting as the motor.

3. The electric motor control apparatus according to claim 2, further comprising:
   a PAM controlled motor selecting unit for determining an electric motor to be selected as a PAM controlled motor by comparison between first total power loss including the total amount of power loss in each inverter when the voltage control unit on the power generation side performed the voltage transformation control with the electric motor acting as the motor being used as the PAM controlled motor, and second total power loss including the total amount of power loss in each inverter when the voltage control unit on the driving side performed the voltage transformation control with the electric motor acting as the generator being used as the PAM controlled motor.

4. The electric motor control apparatus according to claim 3, wherein the first total power loss and the second total power loss each include power loss in the DC—DC converter.

5. An electric motor control apparatus, comprising:
   at least two electric motors acting as a motor and a generator;
   a battery;
   an inverter for generating a drive voltage of the electric motor from an input DC voltage and outputting the drive voltage when the electric motor acts as the motor, and converting a generated voltage of the electric motor to a DC voltage and outputting the DC voltage when the electric motor acts as the generator, the inverter being connected between each of the electric motors and the battery;
   a voltage transformation control unit for performing a PWM control with an ON-OFF control action of a switching element forming an inverter connected to the electric motor activated as the motor to transform the drive voltage for the electric motor activated as the motor from the inverter, and for performing a PWM control with an ON-OFF control action of a switching element forming an inverter connected to the electric motor activated as the generator to transform the generated voltage of the electric motor activated as the generator;
   a DC—DC converter for transforming an I/O voltage between the battery and each of the inverters, the DC—DC converter being connected to the battery; and
   under conditions where at least one of the electric motors acting as the generator is selected as a PAM controlled motor and the inverter connected to the PAM controlled motor is placed in a state to output a DC voltage without voltage transformation using the voltage transformation control unit,
   a voltage control unit on the driving side for transforming the output voltage of the DC—DC converter to a level which allows a generation of a drive voltage corresponding to a target output of the electric motor acting as the motor with the inverter connected to the electric motor acting as the motor, and performing the voltage transformation using the voltage transformation control unit in such a way as to generate the drive voltage corresponding to the target output with the inverter connected to the electric motor acting as the motor.

6. An electric motor control apparatus, comprising:
   at least two electric motors acting as a motor and a generator;
   an inverter for generating a drive voltage of the electric motor from an input DC voltage and outputting the drive voltage when the electric motor acts as the motor, and converting a generated voltage of the electric motor to a DC voltage and outputting the DC voltage when the electric motor acts as the generator, the inverter being connected between the electric motors;

a voltage transformation control unit for performing a PWM control with an ON-OFF control action of a switching element forming an inverter connected to the electric motor activated as the motor to transform the drive voltage for the electric motor activated as the motor from the inverter, and for performing a PWM control with an ON-OFF control action of a switching element forming an inverter connected to the electric motor activated as the generator to transform the generated voltage of the electric motor activated as the generator; and under conditions where at least one of the electric motors acting as the motor is selected as a PAM controlled motor and the inverter connected to the PAM controlled motor is placed in a state to generate a drive voltage without voltage transformation with the PWM control, a voltage control unit on the power generation side for transforming the output voltage of the inverter connected to the electric motor acting as the generator with the voltage transformation control unit in such a way as to input a DC voltage corresponding to a target output of a PAM controlled motor to the inverter connected to the PAM controlled motor.

7. The electric motor control apparatus according to claim 6, further comprising, under conditions where at least one of the electric motors acting as the motor is selected as a PAM controlled motor and the inverter connected to the PAM controlled motor is placed in a state to output a DC voltage without voltage transformation using the voltage transformation control unit, a voltage control unit on the driving side for performing voltage transformation using the voltage transformation control unit in such a way as to generate a drive voltage corresponding to a target output of the electric motor acting as the motor with the inverter connected to the electric motor acting as the motor.

8. The electric motor control apparatus according to claim 7, further comprising a PAM controlled motor selecting unit for determining an electric motor to be selected as a PAM controlled motor by comparison between first total power loss including the total amount of power loss in each inverter when the voltage control unit on the power generation side performed the voltage transformation control with the electric motor acting as the motor being used as the PAM controlled motor, and second total power loss including the total amount of power loss in each inverter when the voltage control unit on the driving side performed the voltage transformation control with the electric motor acting as the generator being used as the PAM controlled motor.

9. An electric motor control apparatus, comprising:

at least two electric motors acting as a motor and a generator;

an inverter for generating a drive voltage of the electric motor from an input DC voltage and outputting the drive voltage when the electric motor acts as the motor and converting a generated voltage of the electric motor to a DC voltage and outputting the DC voltage when the electric motor acts as the generator, the inverter being connected between the electric motors;

a voltage transformation control unit for performing a PWM control with an ON-OFF control action of a switching element forming an inverter connected to the electric motor activated as the motor to transform the drive voltage for the electric motor from the inverter and for performing a PWM control with an ON-OFF control action of a switching element forming an inverter connected to the electric motor activated as the generator to transform the generated voltage of the electric motor; and under conditions where at least one of the electric motors acting as the generator is selected as a PAM controlled motor and the inverter connected to the PAM controlled motor is placed in a state to output a DC voltage without voltage transformation using the voltage transformation control unit, a voltage control unit on the driving side for performing the voltage transformation using the voltage transformation control unit in such a way as to generate a drive voltage corresponding to a target output of the electric motor acting as the motor with the inverter connected to the electric motor acting as the motor.

* * * * *